WILLIAM H. CORNELL.
Improvement in Sectional Steam Boilers.
No. 4,677. Reissued Dec. 19, 1871.
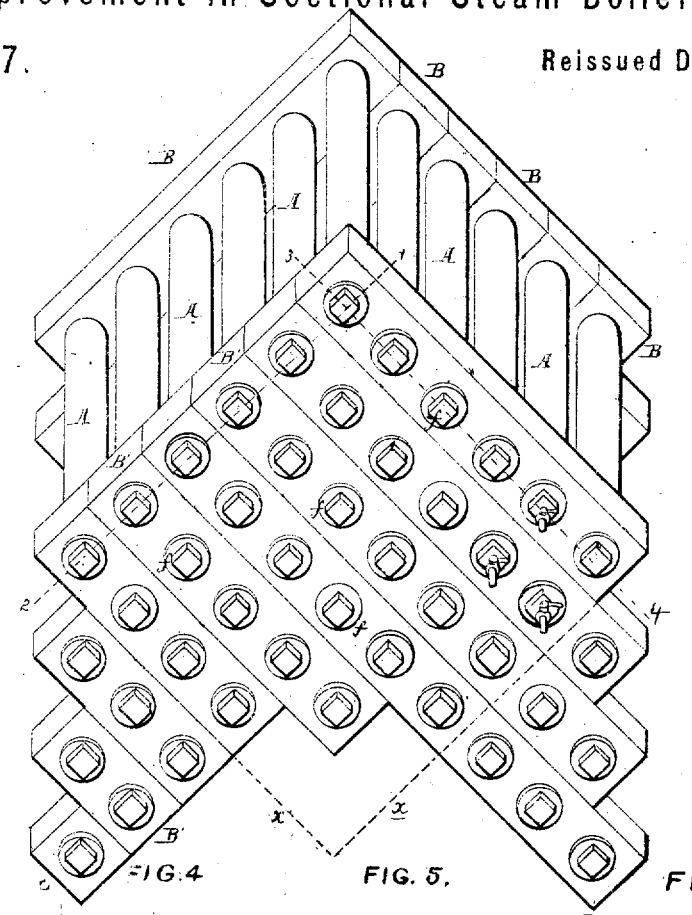
FIG. 1.
FIG. 2.
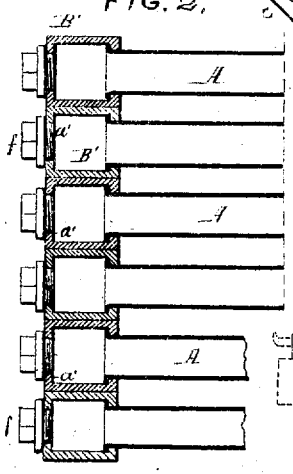
FIG. 4
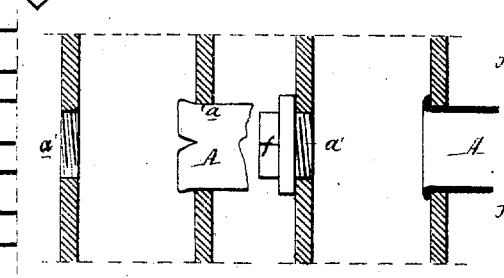
FIG. 5.
FIG. 3.
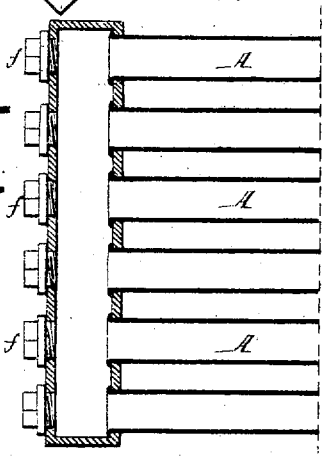
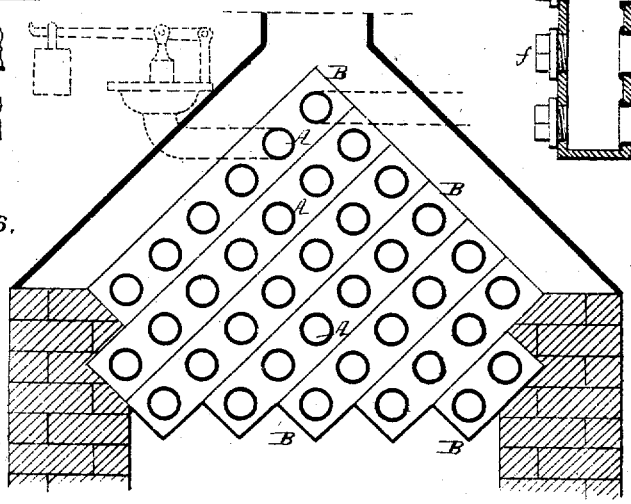
FIG. 6.
WITNESSES
Thos. McIlvain
John Parker
W. H. Cornell
by his Atty.
Howson and Sons.
AM. PHOTO-LITHOGRAPHIC CO. N.Y. (OSBORNE'S PROCESS)

UNITED STATES PATENT OFFICE.

WILLIAM H. CORNELL, OF EASTON, PENNSYLVANIA.

IMPROVEMENT IN SECTIONAL STEAM-BOILERS.

Specification forming part of Letters Patent No. 113,857, dated April 18, 1871; reissue No. 4,677, dated December 19, 1871.

I, WILLIAM H. CORNELL, of Easton, county of Northampton, State of Pennsylvania, have invented an Improved Sectional Steam-Boiler, of which the following is a specification:

My invention consists of a sectional steam-boiler composed of horizontal or slightly-inclined tubes, connected at their opposite ends to two sets of separate and independent boxes inclined in opposite directions, and arranged in the peculiar manner fully described hereafter, the whole forming a boiler in which the heat of the furnace is utilized to a greater extent than in ordinary boilers, and in which such a perfect circulation is obtained that the steam is separated from the water and leaves the boiler in a dry and superheated condition.

Figure 1 is a front perspective view of my improved sectional steam-boiler; Fig. 2, a longitudinal section of the same on the line 1 2, Fig. 1; Fig. 3, a longitudinal section on the line 3 4, Fig. 1; Figs. 4 and 5, detached views drawn to an enlarged scale; and Fig. 6, a transverse sectional view of a slightly-modified form of boiler with a portion of the furnace.

The boiler consists of a number of horizontal or slightly-inclined wrought-iron tubes, A, each of which is connected at one end to one of a series of inclined cast-iron boxes, B, and at its opposite end to one of a series of similar boxes, B′, inclined in a direction contrary to that of the boxes B. The inclined boxes of each series may be in contact with, but are entirely separate and disconnected from, each other, so that they may expand and contract independently. Free communication, however, is established between all of the boxes of both series, but in an indirect manner by means of the connecting-tubes. Each end of each tube is adapted to an opening, *a*, formed for its reception in the inner shell *c* of its box B or B′, and is swaged or expanded therein in the manner plainly shown in Figs. 2, 3, 4, and 5, so that it may overlap the edges of the opening *a* through which it is passed. This swaging is effected by means of an expanding tool, which is inserted through an opening, *a′*, formed in the outer shell *d* of the end box at a point directly opposite the end of the tube, the said opening, after the swaging of the tube, being closed by a screw-plug, *f*, or hand-hole plate and yoke, which can be readily removed when access has to be obtained to the interior of the boiler for purposes of cleansing or repairs.

I have ascertained by practical experience that for this form of boiler the swaged joints at the ends of the tubes are less liable to leak than either threaded or packed joints.

I prefer, for convenience in arranging the boiler within a furnace, that the end boxes should be of different lengths, as shown in Fig. 1 or in Fig. 6; but the said boxes might be all of the same length, as indicated by the dotted lines *x x* in Fig. 1, providing only that such an inclined arrangement is retained as to reduce the boiler in width toward the top, and thus correspondingly decrease the number of tubes as the top of the boiler is approached.

The advantages arising from the peculiar arrangement of the tubes and inclined boxes, which constitute the boiler, will be best understood by referring to Fig. 6, where it will be seen that the tubes, instead of being arranged in horizontal rows and one directly above the other, which would be the case if the boxes at one end were horizontal and those at the other end vertical, are alternated or staggered—owing to the inclination of the boxes—so that the heated products of combustion in passage upward must impinge against and envelop the tubes, instead of passing upward freely between them.

It will be seen also that the tubes, besides being alternated or staggered, are, owing to the peculiar arrangement of the end boxes, gradually decreased in number toward the top, and the lowermost tubes also are not in direct communication with the upper tube or tubes from which the steam is taken, but are connected with the same through several intervening boxes and tubes.

This peculiar arrangement of end boxes and tubes constitutes my invention, as it insures a complete circulation within the boiler of the heated water and steam, and, owing to the circuitous course and the constant changing of the direction of the currents, causes the steam in its upward passage to be separated from the water so that it may pass from the boiler in a dry and superheated condition.

I do not claim, broadly, a boiler in which the boxes at one end are inclined in a direction contrary to that of the boxes at the opposite end; nor do I claim arranging inclined boxes at one end at right angles or thereabout to those at the opposite end; but

I claim as my invention—

A boiler, in which the tubes and end boxes are arranged substantially as herein described, for the purpose specified.

In testimony whereof I have signed my name to this specification in the presence of two sub scribing witnesses.

WM. H. CORNELL.

Witnesses:
FRANK DRAKE,
A. K. MICKLER.

(148)